Aug. 8, 1939.     T. VEITCH     2,168,723
ADVERTISING DISPLAY MECHANISM
Filed Dec. 9, 1937     4 Sheets-Sheet 1

Aug. 8, 1939.  T. VEITCH  2,168,723
ADVERTISING DISPLAY MECHANISM
Filed Dec. 9, 1937  4 Sheets-Sheet 3

Inventor
Thomas Veitch
By his Attorneys
Williams, Rich & Morse

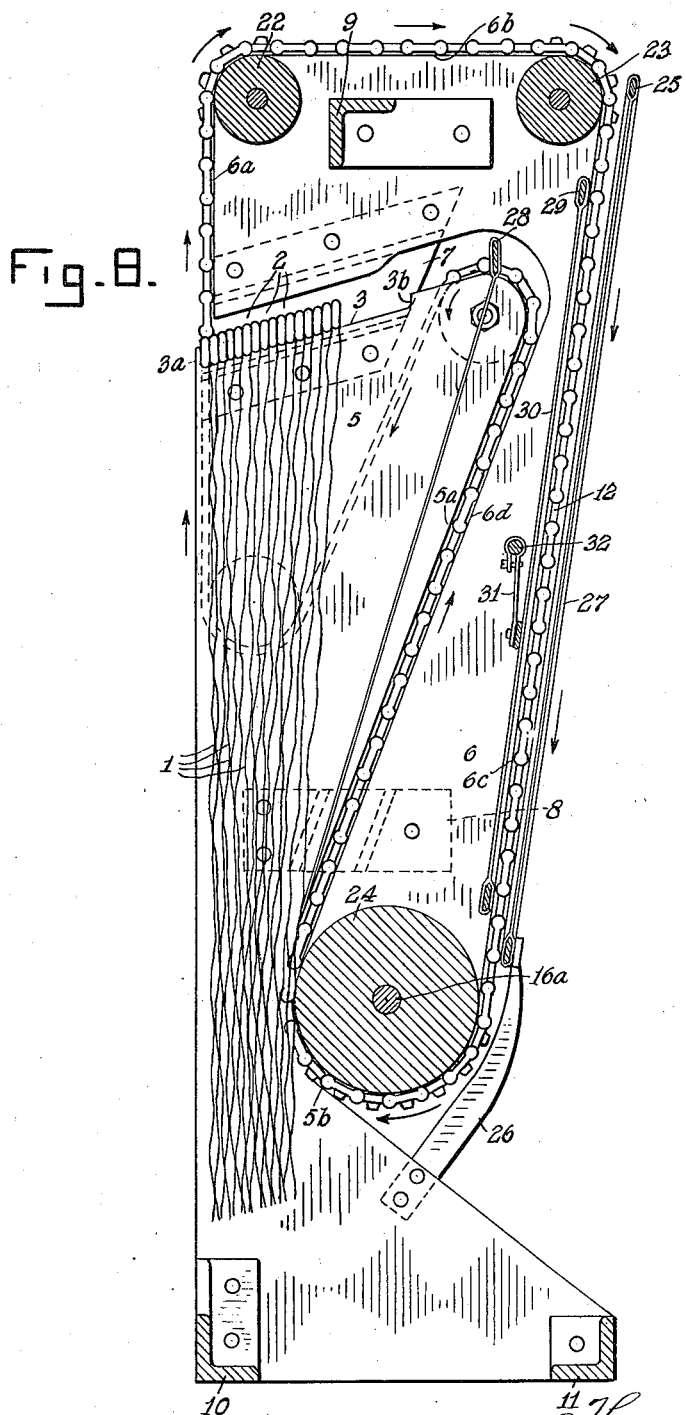

Patented Aug. 8, 1939

2,168,723

UNITED STATES PATENT OFFICE 2,168,723

ADVERTISING DISPLAY MECHANISM

Thomas Veitch, Allenhurst, N. J.

Application December 9, 1937, Serial No. 178,837

11 Claims. (Cl. 40—36)

The present invention relates to a novel display mechanism and has for its object to provide a machine for handling display posters for advertising purposes whereby a number of displays, such as printed matter, lithographs, photographs or other forms of advertisements may be exhibited successively. In general, the invention comprehends a mechanism for supporting a number of flexible posters, maps, charts or the like, one behind another in such a way that the foremost one may be picked off or withdrawn and transported to the rear of the group, during which movement a period of rest is provided for viewing the next poster which is then exposed to view.

In carrying out my invention, I mount the displays on rails from which they are suspended, support these on guides and provide a carrier which travels in a circuitous path from the front of the rail support to a cast-off position at the rear thereof so that the operation of the mechanism is a continuous one periodically exposing each display for a given length of time, or in interrupted progression from the first to the last. My invention further comprehends a display machine which can be manufactured in various sizes but in which the same standard parts can be used in displays of various areas. A feature of the mechanism is that its arrangement is such that no operating part is exposed in the display window during the operation of the machine.

To these and other ends the invention comprises further improvements and arrangement of parts all of which will be further described, the novel features being particularly pointed out in the appended claims.

In the drawings:

Fig. 8 is a view similar to Fig. 3 showing the manner in which the lower guide roller serves to position the lower ends of the posters.

Similar reference characters in the several figures indicate similar parts.

Figure 6:
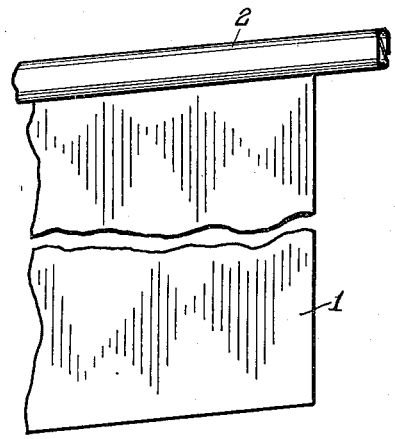
Fig. 6 is a detailed view of a poster and its head rail.

In carrying out my invention, I provide a guideway for supporting a number of posters one behind the other and a carrier which travels through a circuitous path and picks up the foremost poster of the series, moves it upwardly, rearwardly and downwardly and again upwardly to a cast-off position at the rear of the supporting guide to return the poster to its normal suspended position. The posters indicated by I are flexible and each is suspended from a head rail 2, preferably a metal strip, bent or folded as illustrated in Fig. 6 to give it the required stiffness and also provide a convenient means for clamping the upper end of the sheet I between its folds. The extremities of the rails project beyond the edges of the posters, as shown particularly in Fig. 6, to form bearings which rest upon guides formed on the side pieces of the framework.

Figure 2:
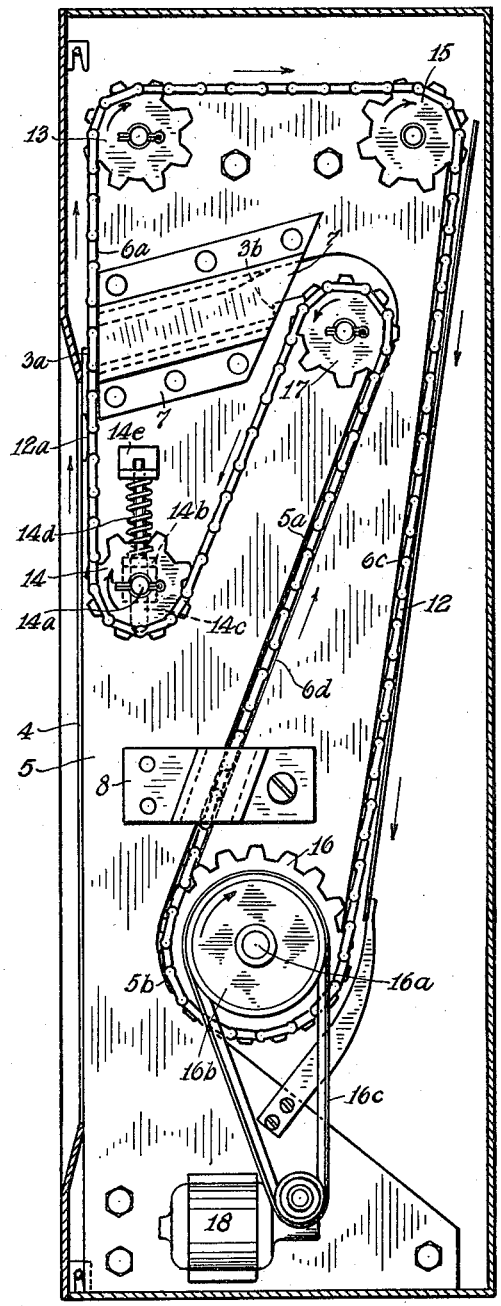
Fig. 2 is a side view of the mechanism shown in a cabinet.
Figure 5:
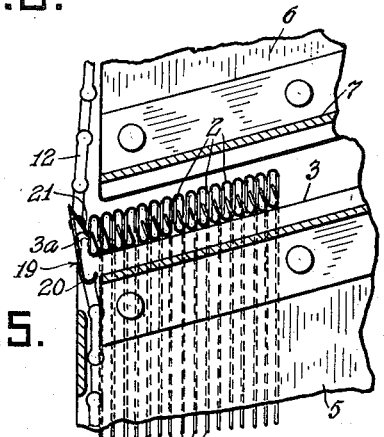
Fig. 5 is a detailed view showing the poster rail support with a number of posters in operating position thereon in conjunction with the pick-up element for removing the foremost poster of the series taken on line 5x—5x of Fig. 1.

The most important portions of the guides comprise an inner guideway somewhat in the shape of a backwardly formed letter S which contributes to the compactness of the structure. The upper portion 3 of this inner guideway extends rearwardly from the poster display window or opening 4 in front of the cabinet and serves as the support for the ends of the rails 2 when the posters are at rest. The guideway 3 is preferably disposed at such an angle that a rail placed on its rear end will gravitate forwardly so that when a series of posters are supported thereon their rails will lie in engagement and the weight of the mass will be such as to insure the rail of the foremost poster being pushed forwardly against a stop 3a (Figs. 2 and 5). The guide 3 is preferably formed on the upper edge of the frame member 5, the rear edge of which preferably extends downwardly and forwardly as indicated at 5a, where it is rounded off as shown at 5b. The outer guide comprises edge portions of the plate 6 which with the plate 5 forms one of the sides of the framework. Extending upwardly above the guide 3 is the front vertical guide 6a which leads into the horizontal guide 6b and the downwardly and forwardly extending rear guide 6c, the lower end of which is rounded off to match the portion 5b and extends upwardly parallel to the inner guide portion 5a as indicated at 6d.

The plates 5 and 6 are joined at suitable points by channel pieces 7 and 8 and the side pieces which they compose are united at the upper end by a cross-bar 9 and at the bottom by cross-bars 10 and 11 at the forward and rear corners respectively.

A suitable carrier serves to elevate a poster, at the forward end of the guideway 3, in a vertical direction by means of a pick-up which engages the poster rail 2 and moves it vertically around the outer guides finally bringing the rail upward and depositing it on the inner end of the portion 3 of the guideway. By reason of this direction of movement, the flexible poster trails behind its rail 2 until its rail again reaches its normal position of elevation. There are, therefore, interposed in this path of travel suitable guides for the flexible bodies of the posters. The carrier proper comprises two flexible elements such as link chains 12, each of which has a vertical portion or stretch 12a extending in front of the forward end of the guideway 3 which is supported in this position by upper sprockets 13 arranged at the upper front corners of the side pieces of the frame and lower sprockets 14 mounted midway of said frame at the front edges of the side pieces. The lower sprockets 14 are mounted on studs 14a, carried on bearings 14b, guided in slots 14c, to which tension is applied for the purpose of keeping the carrier chains taut by springs 14d, the upper ends of which bear against brackets 14e.

Other sprockets 15 and 16 are placed at the rear corners of the plates 6. A fifth sprocket 17 for each chain is located on the plate 5 at the bend between the inner guideways 3 and 5a. These are in a position above and to the rear of the respective sprockets 14 and so located that whenever a poster rail 2 passes around them it is cast off as before mentioned. Equal and simultaneous movement is imparted to the carrier chains by mounting the two sprockets 16 on opposite ends of a shaft 16a which also carries a drive pulley 16b driven by the belt 16c from a motor or other source of power 18.

Figure 1:
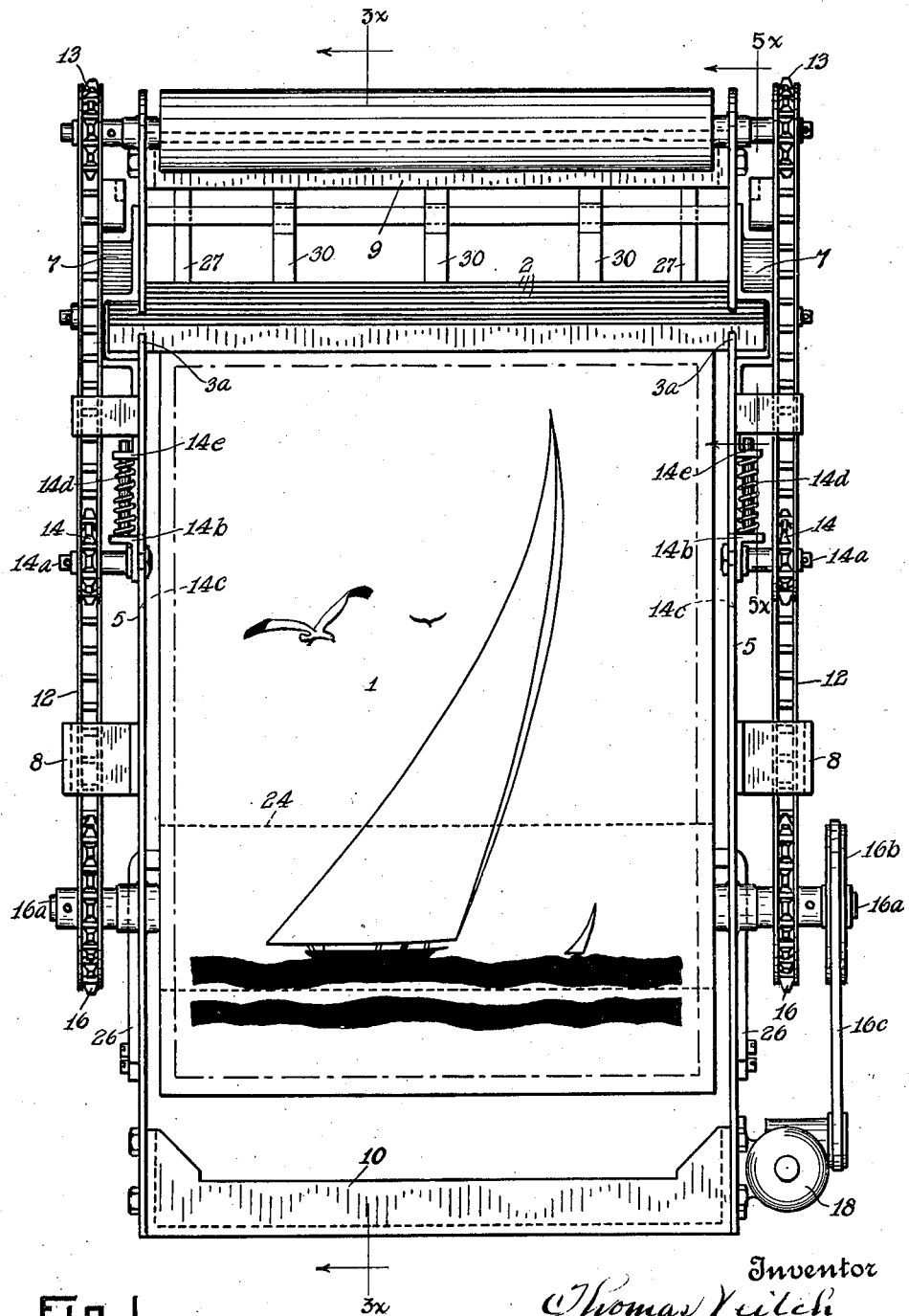
Fig. 1 is a front elevation of the mechanism illustrating one embodiment of my present invention, as seen when removed from the cabinet.
Figures 4, 7:
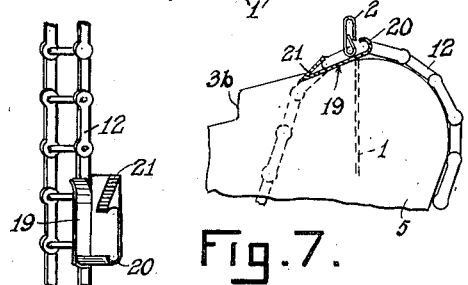
Fig. 4 is a detailed view of a portion of one of the carriers illustrating the poster pick-up element.
Fig. 7 is a detail showing a pick-up on the carrier in a position of delivering a poster rail onto its support.

At opposite points on the carriers, pick-up elements 19 are attached such as shown in Fig. 4. The flexible carriers are mounted in planes outside the previously described guides and guideways as shown in Fig. 1 and the pick-up elements extend inwardly therefrom in a position to engage the extending ends of the poster rails 2. Each of these pick-ups has at its lower end a hook 20 and at its upper end a beveled surface 21 as shown in Figs. 4 and 5. The space between the lower end of this inclined portion and the hook 20 is slightly greater than the width of the poster rail 2 to permit the latter to easily enter the hook, this action being facilitated by the beveled edge which upon striking the bottom edge of a rail causes the pick-up to be canted slightly as shown in Fig. 5. The tension of the springs 14d causes the beveled ends of the pick-ups to snap into position over the top of the rail 2 at the instant the hook portions reach a point to engage their lower edges.

The upward movement of the carrier 6 disengages the foremost poster rail from the guide 3, and carries it into engagement with the vertical guide 6a and from there on it rides in contact with the outside set of guides 6b, 6c and 6d, from which latter it is prevented from disengagement from the pick-ups by the parallel portions of the inner guides 5a and 6d. As the pick-up on the carrier passes around the sprocket 17, its open side is uppermost as shown in Fig. 7 and as it reaches the cast-off position the curved rear end of the guide 3 lifts it out of engagement with the pick-up during the continued forward movement of the latter. The poster rail is then in the position indicated by 28 in Figs. 2 and 7 from which the hooked ends of the pick-ups push the rail 2 onto the inclined portion of the guides. As before explained, the guide 3 being inclined permits the poster rail to move forwardly under its own weight. The guide 3 is provided with a step 3b which limits the movement rearwardly of the rails and is particularly useful in preventing their displacement when the rails are inserted in the guides from its forward end.

For the purpose of supporting the flexible ends of a poster as it trails behind its rail I provide a pair of guide rollers 22 and 23 at the top of the framework and another roller 24 at the bottom of the frame piece 6. Between the upper rear roller 23 and the lower roller 24 I provide friction devices between which it passes, which keep the poster in alignment with its rail and prevents it from collapsing. These devices comprise a light rectangular frame 25 supported at its lower end on a bracket 26 across which a few tapes, as indicated at 27, are wound and an opposing framework 29 carrying longitudinal tapes 30. This frame is supported at its center by a bracket 31 depending from the cross-bar 32 on which the bracket may be rotated to move the frame 28 toward or from the frame 25 to regulate the friction imparted to a poster being drawn between them.

Another function to be attributed to the guide roller 24 in the position shown is that of positioning the lower ends of a group of posters and holding them with just the amount of pressure desired to prevent their lower ends from wavering.

Figure 3:
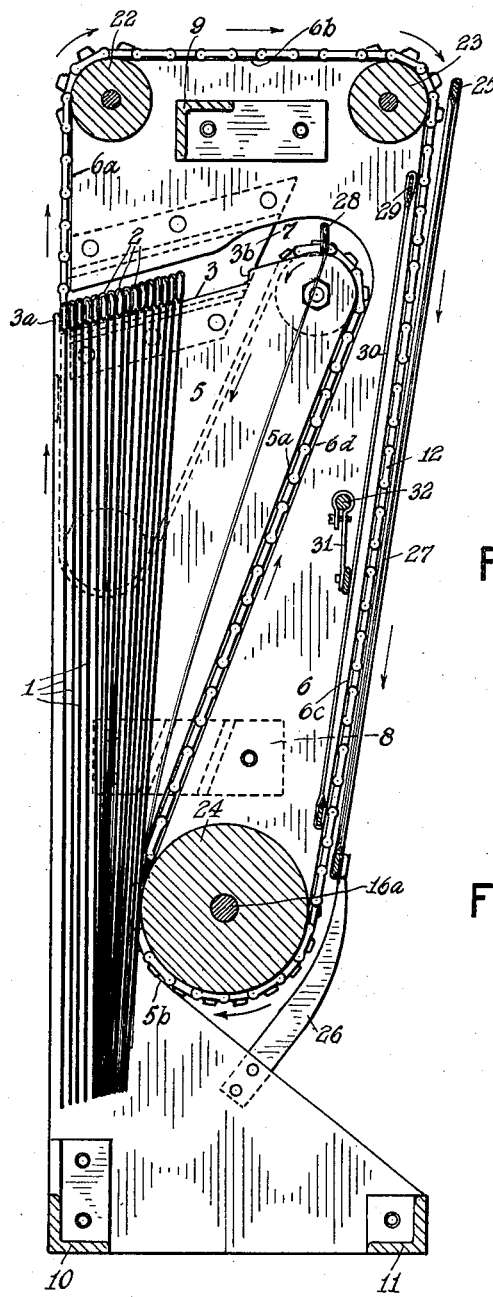
Fig. 3 is a cross-sectional view taken on line 3x—3x of Fig. 1.

In Fig. 3 a few of the outermost posters are shown as hanging free for purposes of illustration whereas in actual practice the paper sheets do not form parallel planes throughout their length and breadth and the sheaf as a whole at its lower end being held in a forward position by the roller 24 assures the holding of the foremost poster in display position.

A display device embodying my invention may be made in various sizes. It is adapted for continuous operation, the period of exposure of the successive display posters, or pictures depending on the speed at which the carriers are driven and the number of sets of pick-ups mounted on said carriers.

What is claimed is:

1. In a poster display mechanism, the combination with a framework composed of side pieces each comprising a forward lower section and an upper rear section spaced apart to form a guideway between their upper and lower edges and between their rear and front edges respectively, and connections between the respective sections of a poster rail carried at its ends on the top of the lower section, a continuously movable carrier mounted on the side pieces and following the paths of the guides and pick-up members on the carriers for engaging said rail and causing it to traverse the guides.

2. In a poster display mechanism, the combination with a framework composed of side pieces each comprising a forward lower section and an upper rear section, the front, top and rear edges of the upper rear section also serving as guides, and connections between the respective sections of each side piece of a poster rail carried at its ends on the top of the lower section, a flexible movable carrier mounted to traverse the guides of the upper rear section, and means thereon for engaging a poster rail to carry it from its normal position of rest in engagement with said guides and to discharge it at the rear of the guide on the top of the front piece.

3. In a poster display mechanism, the combination with a frame composed of right and left hand side pieces each comprising a forward lower section and an upper rear section, the front, top and rear edges of the upper rear section also serving as guides, and connections between the respective sections of each side piece, cross rods connecting the corresponding portions of the two side pieces of the frame and sprocket wheels and rollers on some of the cross pieces, of carrier chains looped around the sprockets to follow the paths of the guides, a poster rail normally resting at its ends on the guide on the top of the front section and pick-up members on the chains adapted to engage such rail in its normal position and transport it in contact with the guides on the rear section and return it to the first-mentioned guide.

4. In a poster display mechanism, the combination with spaced frame pieces having thereon a supporting guide portion and a continuous guide extending upwardly from the front thereof, rearwardly, downwardly and upwardly to the rear end thereof, and a poster rail carried at its ends on said supporting guide, of a movable carrier mounted to traverse the paths of said continuous guides, pick-up devices on the carrier for engaging a poster rail and holding it in engagement with said continuous guides and discharging it onto its supporting guide, rollers at the top of the frame for guiding a poster trailing behind its rail, and a similar roller at the bottom of the frame for positioning a poster in display position.

5. In a poster display mechanism, the combination with spaced frame pieces having thereon a supporting guide portion and a continuous guide extending upwardly from the front thereof, rearwardly, downwardly and upwardly to the rear end thereof, and a poster rail carried at its ends on said supporting guide, of a movable carrier mounted to traverse the paths of said continuous guide, pick-up devices on the carrier for engaging a poster rail and holding it in engagement with said guide and discharging it onto its supporting guide, rollers at the top and bottom of the frame for supporting a poster trailing behind its rail and a friction device located between the upper and lower rollers serving to support a poster during its downward movement.

6. In a poster display mechanism in which a poster rail is picked off the forward end of a guideway and transported to the rear end thereof by a movable carrier, the combination with a flexible carrier, a plurality of rotatable supports for the latter, two of which are mounted to maintain a stretch of the carrier in a path in front of the guides and a yielding mounting for the journal of one of the supports, of a pick-up device on the carrier shaped at its forward end to engage a poster rail and deflect the carrier and at its lower end to engage and lift said rail, said yielding mounting serving to first permit the deflection of the carrier and to subsequently straighten it, and means for moving the carrier.

7. In a poster display mechanism, the combination with a frame comprising spaced side pieces having guideways open at their forward ends and provided with guides extending upwardly from the guideway thence rearwardly, downwardly and upwardly to the rear end of the latter, carriers, rotatable supports for the carriers mounted on the frame to support the carriers in the paths of said guides with stretches in front of the first-mentioned guideways, those rotatable supports which are adjacent each guideway being yieldably mounted, of a plurality of poster rails supported at their ends on said guideway, pick-up devices on the carriers having beveled top portions and underlying pockets forming hooks, said beveled portions being adapted to engage a rail and deflect the carriers to throw the hooks into a position to engage a rail and seat it in the pockets and means for driving the carriers.

8. In a poster display mechanism, the combination with a vertical frame open at its forward side comprising spaced side pieces having guideways open at their forward ends and provided with guides extending upward from the guideways, rearwardly and downwardly in a forwardly inclined direction and thence upwardly to the rear ends of the guideways, of a plurality of poster rails supported at their ends on the latter, each carrying a flexible poster, carriers adjacent each side piece, rotatable supports therefor journaled at the turning points of the guides and at a point below the forward ends of the guideways and a roller at the lower end of the inclined guides for positioning the lower ends of posters with relation to the open side of the frame and pick-up devices on the carriers for engaging a poster rail on the forward end of the guideways and transporting it along the path of the guides to the rear ends of said guideways.

9. In a poster display mechanism, the combination with a vertical frame open at its forward side comprising spaced side pieces having guideways open at their forward ends and a plurality of poster rails mounted at their ends on said guideways each having a flexible poster suspended therefrom, of a roller journaled between the side pieces and located with its forward edge above the lower extremities of the posters and in a position to maintain the group of posters with the foremost poster in display position, said frame pieces having guides extending upwardly above the forward end of the guideways, rearwardly and downwardly to said roller and upwardly therefrom to the rear ends of the guideways, flexible carriers supported to follow the path of the guides and to pass the front ends of the guideways, and pick-up devices on the carriers adapted to engage a poster rail at the forward end of the guideways and transport it to their rear ends.

10. In a poster display mechanism, the combination with a vertical frame open at its forward side comprising spaced side pieces having guideways open at their forward ends and a plurality of poster rails mounted at their ends on said guideways each having a flexible poster suspended therefrom, of a roller journaled between the side pieces and located with its forward edge above the lower extremities of the posters and in a position to maintain the group of posters with the foremost poster in display position, said frame pieces having guides extending upwardly above the forward ends of the guideways, rearwardly and downwardly to said roller and upwardly therefrom to the rear ends of the guideways, other poster-guide rollers at the upper forward and rear turns of the frame guides, friction devices following the path of the downwardly extending portion of the guide for restraining the free movement of a poster as it travels in the direction of said guide, a continuously moving carrier following the path of the guides on the frame and a pick-up member thereon for engaging a poster rail at the front end of the guideways holding it in contact with the frame guides and discharging it at the rear end of the guideways.

11. In a poster display mechanism, the combination with a frame open at its forward side and composing side portions each composed of a forward and rear part, shaped to provide a reversed S-shaped path between them and form on the front part a poster rail support opening at the front of the frame and a guide extending downwardly and forwardly from the rear end of said support, the rear part of the frame having forward, top and rear edges comprising guides extending from above the front end of said support to the bottom end of the first mentioned guide, a movable carrier supported on revoluble pinions journaled at the turning points of said guides, a poster rail held at its ends on said supports and a pick-up on the carrier adapted to remove the rail from said supports, transport it in contact with said guides and deliver it to the rear ends of the supports.

THOMAS VEITCH.